United States Patent Office 2,868,837
Patented Jan. 13, 1959

2,868,837
TELOMERS

Peter D. Burland and Robert G. Roth, La Marque, Tex., assignors to Monsanto Chemical Company, St. Louis, Mo., a corporation of Delaware No Drawing. Application April 4, 1955
Serial No. 499,241

12 Claims. (Cl. 260—537)

The present invention relates to new halogen-containing polymerization products and to a method for producing them. More particularly, the invention pertains to telomers of acrylic acid and its salts and acrylamide prepared by hydrolysis of the product from the free-radical-catalyzed reaction of acrylonitrile with certain halogenated hydrocarbons.

This application is a continuation in part of application Serial No. 470,514, filed November 22, 1954, and application Serial No. 451,074, filed August 19, 1954, both now abandoned.

Low average molecular weight products may be prepared from unsaturated monomers having olefinic unsaturation by a process termed "telomerization." Telomerization is defined in U. S. Patent 2,440,800 issued to Hanford and Joyce as follows: "the process of reacting, under polymerization conditions, a molecule YZ which is called a 'telogen' with more than one unit of a polymerizable compound having ethylenic unsaturation called a 'taxogen' to form products called 'telomers' having the formula $Y(A)_nZ$ where $(A)_n$ is a divalent radical formed by chemical union, with the formation of new carbon bonds, $n$ being any integer greater than one, and Y and Z being fragments of the telogen attached to the terminal taxogens." Much work has been done in the prior art on telomerization of olefinic materials such as ethylene, propylene, octene-1, styrene, allyl chloride, and the like, but little attention has been given to the telomerization of acrylic compounds.

Accordingly, it is an object of this invention to provide novel compositions of matter comprising telomers of a monomeric material selected from the group consisting of acrylic acid, its alkali metal and ammonium salts, and acrylamide and a halomethane, said telomers containing the monomeric unit having the formula

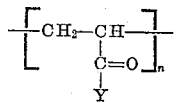

wherein Y may be $NH_2$, OH or OM, M being a cation selected from the group consisting of the alkali metals or ammonium and $n$ is an integer from 2 to 30. Hereinafter, for convenience, these materials are referred to as acrylic telomers.

It is a further object of the invention to provide a process for the preparation of such acrylic telomers.

Other objects and advantages of the invention will become apparent from the description which follows.

In one embodiment of the invention, a telomer produced by the reaction of acrylonitrile and a halomethane in the presence of a free-radical-type catalyst and having the formula

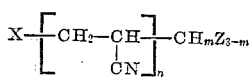

wherein X is hydrogen or a halogen, Z is a halogen, $n$ is an integer from 2 to 30, and $m$ may vary from 0 to 2 inclusive, is subjected to hydrolysis to yield an acrylic telomer.

In another embodiment of the invention, the novel compounds may be prepared from acrylic acid itself by polymerizing it with a halomethane as a chain transfer agent in the presence of a free-radical-type catalyst. For example, acrylic acid may be reacted with a halomethane in proportions such that the ratio of the halomethane to the acid is in the range from 1:1 to 10:1 at a temperature between about 50° C. and about 150° C. with benzoyl peroxide as a catalyst to obtain a compound of the formula

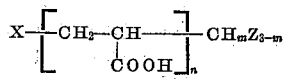

wherein X may be hydrogen or a halogen, Z is a halogen, $n$ is an integer from 2 to 30, and $m$ may vary from 0 to 2 inclusive.

The reaction products of the invention are neither simple addition products nor interpolymers. Interpolymers result from a number of molecules of each reactant entering into the polymer chain and the product is a high molecular weight polymeric material. In the reaction products of the invention, however, only one molecule of the halomethane compound enters into the formation of each molecular species and the average molecular weight of the product is, in general, considerably lower than that of an interpolymer formed under comparable conditions. The novel compositions of the invention, therefore, have special properties not to be found in the conventional acrylic acid polymers of the prior art which make them particularly desirable in certain applications.

The following examples are presented to illustrate the invention. All parts given are by weight.

*Example 1*

A stainless steel rocking autoclave of three-liter capacity was charged with 222.4 parts of acrylonitrile, 2577.6 parts of carbon tetrachloride and 3.3536 parts of benzoyl peroxide. The autoclave was sealed, heated to 100° C. and rocked at that temperature for approximately five hours. At the end of that time, the autoclave was opened and its contents were filtered through a Buchner funnel. The precipitated polymer was dried at a temperature of 80° C. for 36 hours to remove all traces of the chain transfer agent. The polymeric product, a free-flowing buff-colored powder of low bulk density, contained 25.2% N by Kjeldahl analysis, had a molecular weight of 1390, i. e., a degree of polymerization of approximately 26, and a specific viscosity of 0.2532 as determined at 30° C. on a solution of 0.2 g. of the material in 50 ml. of dimethylformamide. A yield of 190.0 parts of the telomer was obtained.

A 100-gram sample of the telomer was slurried with 750 ml. of distilled water in a flask equipped with a stirrer, a thermometer and a reflux condenser. A solution of 73 g. of sodium hydroxide (98%) in 250 ml. of distilled water was added to the slurry with stirring while the flask was heated gently. The mixture was not permitted to boil until most of the solid material had gone into solution. It was then kept under reflux conditions for a period of about 11.5 hours with provision being made to allow the water vapor to escape in order to concentrate the sample. The resulting mixture of hydrolyzed telomer weighing 437.1 g. was analyzed and found to contain 51.4% $H_2O$ (Fischer method) and only 0.9% residual nitrogen on a wet basis. The viscous solution was a clear dark amber color. The molecular weight of the hydrolyzed telomer thus obtained was 1890 as calculated from the nitrile telomer from which it was derived.

A second sample of the same telomer was hydrolyzed by means of an alcohol-water-caustic slurry technique in order that the hydrolyzed product might be recovered in solid form by means of a simple filtration step. Approximately 47.1 g. (equivalent to 0.89 mole of acrylonitrile) of the telomer was charged with 200 g. of ethanol to a three-liter, triple-necked flask equipped with a stirrer, reflux condenser and thermometer. The stoichiometric quantity of sodium hydroxide required for hydrolysis, 35.6 g. (0.89 mole) dissolved in 41.0 g. of distilled water was then added and the mixture was stirred thoroughly until the solid material was well wetted. Heat was applied to bring the mixture to boiling and it was maintained under reflux conditions for about 14 hours. The mixture was then filtered, the precipitate was washed several times with absolute alcohol and dried overnight at 90° C. The yield of hydrolyzed telomer was 83.1 g. or 98.6% of the theoretical and the product contained 5.4% of residual nitrogen.

*Example II*

A mixture of 278 parts of acrylonitrile, 3222 parts of carbon tetrachloride, and 17.682 parts of benzoyl peroxide was heated for 5 hours in a stainless steel rocking autoclave at a temperature of 100° C. The reaction mixture was filtered through a Buchner funnel and the polymeric precipitate was placed in an evaporating dish and dried for 8 hours at 105° C. Approximately 244 parts of a telomer as a buff-colored, free-flowing powder was obtained, representing a yield of over 90%. The product had a molecular weight of 1100, representing an average degree of polymerization of about 18 or a structure corresponding to the formula

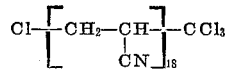

The specific viscosity of this telomer as determined at 30° C. on a solution of 0.2 g. in 50 ml. of dimethylformamide was 0.1671.

This telomer of acrylonitrile was hydrolyzed in an alcoholic caustic slurry in a manner similar to that described in Example I. About 600 ml. of ethanol were placed in a three-liter, triple-necked flask fitted with a thermometer, a reflux-condenser, and a stirrer with 120 g. (3 moles) of caustic dissolved in 135 g. of distilled water (7.5 moles) and 159 g. (equivalent to 3 moles of acrylonitrile) of the dried telomer was added slowly with stirring. The exothermic heat of solution of the caustic in water brought the temperature up to about 55–60° C. and the mixture was thoroughly stirred for about 20 minutes before any heat was applied. Then the temperature was brought up to boiling by means of a heating mantle and the whole was refluxed for a period of about 9 hours. A portion of the alcohol was removed by distillation at an overhead temperature of 78.2° C. The mixture was filtered, the precipitate was washed with the distilled alcohol, and dried in an oven at 105° C. The yield of hydrolyzed product containing 4.55% residual nitrogen and having a molecular weight of approximately 1642 was 273 g., or 96%.

*Example III*

Approximately 53 parts of acrylonitrile are charged with 588 parts of dichloromethane and 1.06 parts of tertiary butyl hydroperoxide to a rocking autoclave and heated at 120° C. for approximately 6 hours. Following the procedure described in Examples I and II, there is recovered in good yield a low average molecular weight product similar in both appearance and physical properties to the acrylonitrile telomers in these other examples. Thereafter, using the technique of hydrolysis described in Examples I and II wherein hydrolysis is effected in an alcoholic medium, in this case isopropanol being employed, the acrylonitrile telomer is converted to an acrylic telomer having a molecular weight and properties very similar to those obtained in the other examples given above.

Many variations in procedure from those given in the examples both in the manner of preparation of the acrylic telomers and in the hydrolysis of them may be made without departing from the scope of the invention. For example, any of the halomethanes, such as $CHCl_3$, $CH_3F$, $CH_3I$, $CH_2I_2$, $CI_4$, $CBr_4$, $CHBr_3$, $CH_2Br_2$, $CH_3Cl$, etc., are as suitable as telogens as are the carbon tetrachloride and dichloromethane mentioned.

The mole ratio of the halomethane to the nitrile may vary over the range from 1:1 to 10:1, for example, depending upon the molecular weight desired in the product. Generally, the molecular weight of the telomer formed decreases with an increase in the ratio of halomethane, or chain transfer agent, to nitrile employed. Since the preferred molecular ratio will depend upon the desired chain length of the product, considerable latitude may be exercised in the choice of reactant quantities. There is, however, a limiting factor with regard to the excess of chain transfer agents used. Amounts greater than that represented by the 10:1 ratio, while they may be employed, serve no useful purpose and necessitate recovery of the halogenated transfer agent for economical reasons.

Catalysts other than the benzoyl peroxide and tertiary butyl hydroperoxide mentioned may also be used. Generally, suitable materials for catalyzing the present process are free-radical-liberating agents, i. e., compounds which will decompose to give free radicals. Such compounds include peroxygen-type catalysts, for example, acyl peroxides such as acetyl, benzoyl, lauroyl or stearoyl peroxides; hydrocarbon peroxides or hydroperoxides such as di-tert.-amyl peroxide, tert.-butyl hydroperoxide, cumene hydroperoxide, p-cymene hydroperoxide; and inorganic percompounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyllead and the like. The quantity of catalyst useful for promoting the addition reaction may range from as little as 0.5% to as much as 5% by weight of the nitrile reacted. Usually, optimum yields are obtained with amounts of catalyst representing from 2–3% by weight of the nitrile employed. Quantities of more than 5% serve no useful purpose and may even cause detrimental side reactions, hence should not be used. Ultraviolet light may be employed with the catalyst or as the sole catalytic agent.

Neither reaction time nor reaction temperature is critical. The time during which the nitrile and halomethane are reacted may be widely varied depending upon the reactant quantities, the reaction temperature used, the nature of the individual catalyst employed, etc. Generally, times of from one to twenty-four hours are employed. The telomerization reaction may be carried out over a wide range of temperatures from 50° C. to 150° C. or above. The preferred temperature depends primarily on the catalyst employed since the minimum temperature of the reaction is that required to decompose the catalyst and generate free radicals. When benzoyl peroxide is the catalyst, for example, the reaction is usually initiated at about 60° C. to about 100° C., while with tertiary butyl hydroperoxide, reaction begins at about 100° C. to about 120° C. Optimum yields are generally obtained by operating at temperatures which permit steady decomposition of the catalyst, with consequent steady liberation of free radicals.

Conditions under which hydrolysis is effected may likewise be varied to some extent. Depending upon the product desired, for example, hydrolysis may be effected by means of either an acid or a base. Suitable acids are sulfuric acid and hydrochloric acid while the alkali metal hydroxides such as sodium and potassium hydroxide and ammonium hydroxide, are suitable bases for the hydrolysis reaction. In acid hydrolysis, the cyanide, or CN, groups in the telomer are converted into either amide, $CONH_2$, or carboxyl, COOH, groups according to the extent of the hydrolysis, the amount of water employed being the main controlling factor. Complete hydrolysis yields the acid derivative, while the intermediate hydrolysis product is the amide. On the other hand, hydrolysis in the presence of a base yields a product wherein the nitrile group has been converted to the acid salt such as COONa, $COONH_4$, etc.

Generally, for complete hydrolysis, for each molecular part of telomer there is employed a molecular part of acid or base and two molecular parts of water. In hydrolyzing to the amide stage, however, only one mole of water and one mole of acid is required per mole of telomer. For practical purposes and to insure as complete hydrolysis as possible, water is usually employed in slight excess, for example, 2.5 moles per mole of telomer.

The hydrolyzing reaction occurs to a minor extent at room temperature but generally the application of some heat is required. Temperatures below 100° C. are employed with temperatures usually maintained at from about 40 to about 80° C. Preferred temperatures lie in the range from about 60 to about 70° C. The time required for the reaction varies with the temperature of the reaction being shorter for a higher temperature and longer for a lower temperature. When operating within the preferred temperature range, it has been shown that a reaction time between about 0.5 hour and about six hours is satisfactory, while a time from about three to about four hours is preferred. Extended periods of time in excess of those mentioned result in little variation in the residual nitrogen content of the finished acrylic telomer.

The product resulting from hydrolysis is usually an aqueous solution which may be used as such or from which the solid hydrolyzed telomer may be recovered. However, recovery is complicated by the fact that such large amounts of water must be evaporated since the telomers are produced in such dilute solutions. To obviate these problems, therefore, hydrolysis may be carried out in a medium which is non-solvent for both the acrylonitrile telomer itself and the hydrolyzed or acrylic telomer but which is miscible with water and the acid or base used. Many alcohols are useful for this purpose. In decreasing order of their utility, there may be mentioned, for example, ethanol, isopropanol or propanol, methanol, and ethylene glycol.

Depending upon the hydrolysis conditions employed, any and all of the following species of acrylic telomers as well as others not listed may be produced by hydrolysis of the corresponding acrylonitrile telomers, $n$ in each case being an integer from 2 to 30.

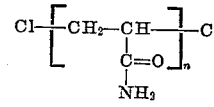 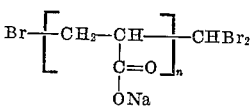

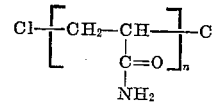 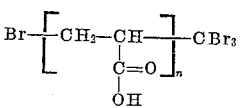

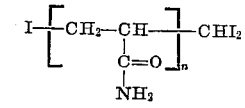 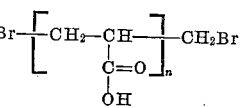

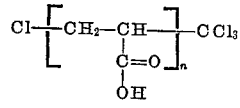 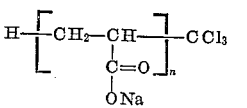

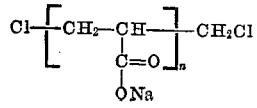

The novel hydrolyzed telomers of acrylonitrile of the invention are useful as molding powders, plasticizers, chemical intermediates, dispersants and/or deflocculants in the treatment of clays and the manufacture of pigments, and as viscosity improvers in drilling muds. The effectiveness of the hydrolyzed telomer prepared in Example I by water solution hydrolysis in the latter application is amply illustrated in the tabulated data below. These data were obtained by testing a synthetic drilling mud in which the indicated amounts of the hydrolyzed telomer were incorporated. The mud contained 35% solids consisting on a dry basis of 10 parts by weight of Tennessee Ball clay, 1 part by weight of bentonite and 4 parts by weight of Dixie Bond clay suspended in water. The breakover from sodium-base to lime-base fluid was achieved by adding 5 g. of hydrate lime for each 350 cc. of the suspension. Standard procedures given in "Recommended Practice for Standard Field Procedure for Testing Drilling Fluids" of the American Petroleum Institute, third edition, May 1950, were used.

| Lb. Hydrolyzed telomer per 42-gal. bbl. | Viscosity | Gel Strength | | Filtration Rate, cc. in 30-Min. API |
|---|---|---|---|---|
| | | 0-Min. | 10-Min. | |
| 0 | Plastic [1] | Plastic | Plastic | 50 (5-min.). |
| 0.5 | do | do | do | 39 (2-min.). |
| 1.0 | do | do | do | 54.5 (5-min.). |
| 2.0 | 20 | 15 | 20 | 90.5. |
| 4.0 | 7 | 0 | 0 | 33.5. |
| 6.0 | 8 | 0 | 0 | 21. |

[1] Above 350 centipoises.

Not only does the incorporation of a small amount of the hydrolyzed telomer drastically reduce the viscosity of the mud, but it tends also to improve the other important functional properties, gel strength and filtration rate, as well.

What is claimed is:

1. Compounds having the formula

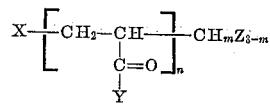

wherein X is chosen from the group consisting of hydrogen and the halogens, Y is chosen from the group consisting of $NH_2$, OH, and OM, where M is a cation chosen from the group consisting of the alkali metals and ammonium, Z is a halogen, $n$ is an integer from 2 to 30, and $m$ may vary from 0 to 2 inclusive.

2. Compounds having the formula

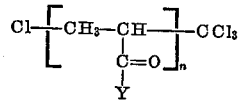

wherein Y is chosen from the group consisting of $NH_2$, OH, and OM, where M is a cation chosen from the group consisting of the alkali metals and ammonium, and $n$ is an integer from 2 to 30.

3. Compounds having the formula

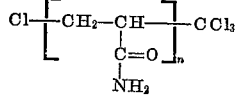

wherein $n$ is an integer from 2 to 30.

4. Compounds having the formula

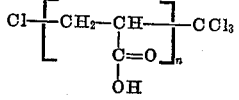

wherein $n$ is an integer from 2 to 30.

5. Compounds having the formula

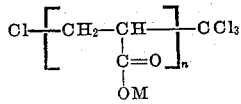

wherein M is a cation chosen from the group consisting of the alkali metals and ammonium, and *n* is an integer from 2 to 30.

6. Compounds having the formula

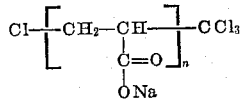

wherein *n* is an integer from 2 to 30.

7. Compounds having the formula

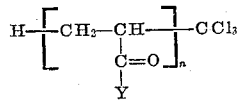

wherein Y is chosen from the group consisting of NH₂, OH, and OM, where M is a cation chosen from the group consisting of the alkali metals and ammonium, and *n* is an integer from 2 to 30.

8. Compounds having the formula

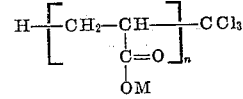

wherein M is a cation chosen from the group consisting of the alkali metals and ammonium, and *n* is an integer from 2 to 30.

9. Compounds having the formula

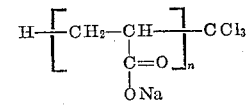

wherein *n* is an integer from 2 to 30.

10. Compounds having the formula

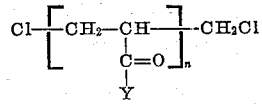

wherein Y is chosen from the group consisting of NH₂, OH, and OM, where M is a cation chosen from the group consisting of the alkali metals and ammonium, and *n* is an integer from 2 to 30.

11. Compounds having the formula

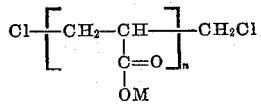

wherein M is a cation chosen from the groups consisting of the alkali metals and ammonium and *n* is an integer from 2 to 30.

12. Compounds having the formula

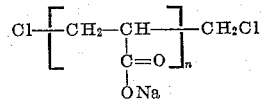

wherein *n* is an integer from 2 to 30.

References Cited in the file of this patent

UNITED STATES PATENTS

| | | |
|---|---|---|
| 2,423,497 | Harmon | July 8, 1947 |
| 2,440,800 | Hanford et al. | May 4, 1948 |
| 2,440,801 | Hanford et al. | May 4, 1948 |

OTHER REFERENCES

Schildknecht: Vinyl and Related Polymers, Feb. 20, 1952, pp. 272–3.

UNITED STATES PATENT OFFICE

Certificate of Correction

Patent No. 2,868,837

January 13, 1959

Peter D. Burland et al.

It is hereby certified that error appears in the printed specification of the above numbered patent requiring correction and that the said Letters Patent should read as corrected below.

Column 6, lines 53 to 57 inclusive, the formula should appear as shown below instead of as in the patent:

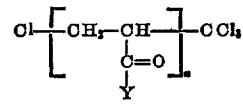

Signed and sealed this 2nd day of June 1959.

[SEAL]

Attest:
KARL H. AXLINE,
*Attesting Officer.*

ROBERT C. WATSON,
*Commissioner of Patents.*